C. W. HILL.
CULTIVATOR ATTACHMENT.
APPLICATION FILED JUNE 25, 1913.
1,072,119.
Patented Sept. 2, 1913.
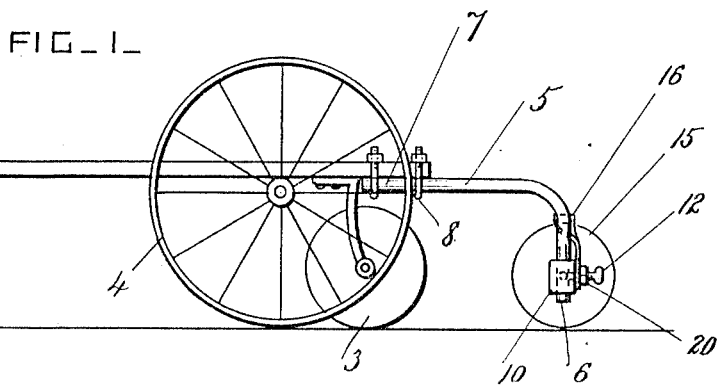
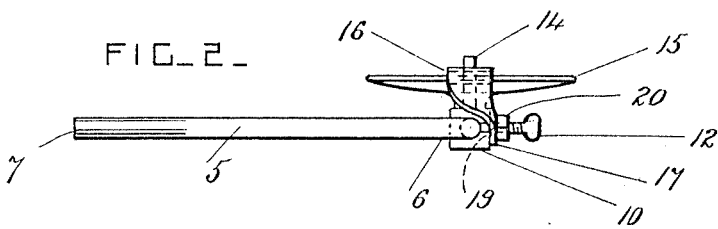
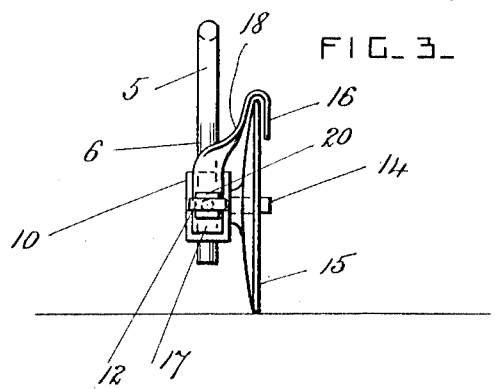
Witnesses
Inventor
Charles W. Hill,
By Herbert W. J. Jenner,
Attorney

UNITED STATES PATENT OFFICE.

CHARLES WESLEY HILL, OF WELLSVILLE, KANSAS.

CULTIVATOR ATTACHMENT.

1,072,119.  Specification of Letters Patent.  Patented Sept. 2, 1913.

Application filed June 25, 1913. Serial No. 775,697.

*To all whom it may concern:*

Be it known that I, CHARLES W. HILL, a citizen of the United States, residing at Wellsville, in the county of Franklin and State of Kansas, have invented certain new and useful Improvements in Cultivator Attachments; and I do hereby declare the following to be a full, clear, and exact description of the invention, such as will enable others skilled in the art to which it appertains to make and use the same.

This invention relates to attachments for cultivators for corn and other similar crops; and it consists of a disk for throwing earth to the roots of the plants supported as hereinafter fully described and claimed.

In the drawings, Figure 1 is a side view of a cultivator provided with an attachment according to this invention. Fig. 2 is a plan view of the attachment, drawn to a larger scale. Fig. 3 is an end view of the attachment.

The cultivator is of any approved construction, and in the present illustration it has a central draft beam 2, cultivator disks 3 supported from the draft beam, and ground wheels 4. Other essential features are not shown as they are of any approved kind.

The attachment is provided with a beam 5 having a downwardly curved rear end portion 6. The front end portion 7 of the beam is secured to the draft beam 2 of the cultivator, or to any other convenient part of the cultivator, by clamps 8. The end portions of the beam 5 are cylindrical, and the rear end portion 6 can be arranged vertically or set at any desired angle before being clamped in place.

An axle block 10 is provided and has a vertical hole 11 which is slipped over the rear end portion 6 of the beam 5. This block 10 is secured in place by a set-screw 12, and it can be adjusted vertically and circumferentially to any desired position before being secured. The axle block has a projecting spindle 14 on one side, and a cultivator disk 15 of any desired size is journaled to revolve freely on the spindle 14.

A scraper 16 is provided and has a hook-shaped upper end portion which hooks over the upper part of the disk 15. The shank 17 of the scraper has a half twist 18 in it, and it is provided at its lower end portion with a hole 19 which is slipped over the set-screw 12. A nut 20 is screwed on the set-screw and clamps the scraper to the block after the set-screw has been screwed up to secure the block to the beam. The disk 15 is drawn along to the rear of the usual cultivator disks 3, and it operates to throw loose dirt toward the stems of the growing plants. The disk 15 can be arranged right hand or left hand as desired, and its angular position can be varied and adjusted to suit the size of the plants and the condition of the soil.

What I claim is:

1. The combination with a cultivator, of an adjustable auxiliary beam provided with a downwardly projecting rear end portion means for clamping the front end portion of the beam to the cultivator after the position of its rear end portion has been adjusted, an axle block adjustable vertically and circumferentially on the rear end portion of the said beam and provided with a laterally projecting spindle, means for securing the axle block to the beam, and a cultivator disk journaled on the said spindle.

2. The combination, with an auxiliary beam adapted to be secured to a cultivator and provided with a downwardly projecting rear end portion, of an axle block adjustable vertically and circumferentially on the said rear end portion and provided with a laterally projecting spindle, a cultivator disk journaled on the said spindle, a set-screw for securing the said block to the beam, a hook-shaped scraper extending over the said disk and having a shank provided with a half twist and a hole which slips over the set-screw, and a nut on the set-screw for clamping the scraper shank to the said block.

In testimony whereof I have affixed my signature in the presence of two witnesses.

CHARLES WESLEY HILL.

Witnesses:
M. S. PARKER,
C. A. MICHAEL.

Copies of this patent may be obtained for five cents each, by addressing the "Commissioner of Patents, Washington, D. C."